United States Patent
Hinkel

(10) Patent No.: US 9,098,910 B2
(45) Date of Patent: Aug. 4, 2015

(54) METHOD FOR GENERATING VIDEO DATA STREAM

(75) Inventor: Ralf Hinkel, Hoeringen (DE)

(73) Assignee: MOBOTIX AG, Winnweiler (DE)

( * ) Notice: Subject to any disclaimer, the term of this patent is extended or adjusted under 35 U.S.C. 154(b) by 719 days.

(21) Appl. No.: 13/121,576

(22) PCT Filed: Sep. 25, 2009

(86) PCT No.: PCT/DE2009/001329
§ 371 (c)(1),
(2), (4) Date: Aug. 11, 2011

(87) PCT Pub. No.: WO2010/034299
PCT Pub. Date: Apr. 1, 2010

(65) Prior Publication Data
US 2011/0285812 A1    Nov. 24, 2011

(30) Foreign Application Priority Data

Sep. 29, 2008  (DE) .................. 10 2008 049 343
Oct. 2, 2008   (DE) .................. 10 2008 049 921

(51) Int. Cl.
*H04N 7/15* (2006.01)
*G06T 3/00* (2006.01)
*G02B 13/06* (2006.01)

(52) U.S. Cl.
CPC .............. *G06T 3/0062* (2013.01); *G02B 13/06* (2013.01)

(58) Field of Classification Search
CPC ..... G06T 3/0062; G06T 5/006; G06T 3/4038; G06T 3/0018; G03B 39/00; G06K 9/00228; G06K 9/32; G06K 9/00791; G02B 13/06
USPC ............................................................ 348/38
See application file for complete search history.

(56) References Cited

U.S. PATENT DOCUMENTS

| | | | |
|---|---|---|---|
| 5,696,503 A * | 12/1997 | Nasburg | 340/933 |
| 6,097,429 A * | 8/2000 | Seeley et al. | 348/154 |
| 6,215,519 B1 * | 4/2001 | Nayar et al. | 348/159 |
| 6,675,386 B1 | 1/2004 | Hendricks et al. | |
| 6,734,911 B1 | 5/2004 | Lyons | |
| 7,071,968 B2 | 7/2006 | Novak | |
| 7,403,643 B2 * | 7/2008 | Ianculescu et al. | 382/118 |
| 7,671,893 B2 * | 3/2010 | Li et al. | 348/211.3 |
| 8,055,029 B2 * | 11/2011 | Petrescu et al. | 382/118 |
| 8,352,072 B2 * | 1/2013 | Gal et al. | 700/245 |

(Continued)

FOREIGN PATENT DOCUMENTS

| | | |
|---|---|---|
| DE | 694 29 028 | 7/2002 |
| EP | 1 341 382 | 9/2003 |

(Continued)

OTHER PUBLICATIONS

International Search Report issued Jan. 18, 2010 in PCT/DE2009/001329 filed Sep. 25, 2009.

*Primary Examiner* — Shan Elahi

(74) *Attorney, Agent, or Firm* — Oblon, McClelland, Maier & Neustadt, L.L.P.

(57) ABSTRACT

The invention relates to a method for generating video stream data relating to different fields of vision from a camera having a sensor which records high resolution images in a distorted manner. According to the invention, image corrections are performed for separate fields of vision, and a total video stream is output from the differently corrected image data.

18 Claims, 10 Drawing Sheets

(56) References Cited

U.S. PATENT DOCUMENTS

| | | | |
|---|---|---|---|
| 2002/0053075 A1* | 5/2002 | Paz et al. | 725/10 |
| 2002/0122585 A1* | 9/2002 | Swift et al. | 382/154 |
| 2003/0038814 A1* | 2/2003 | Blume | 345/585 |
| 2003/0068098 A1* | 4/2003 | Rondinelli et al. | 382/276 |
| 2003/0160863 A1* | 8/2003 | Kakou et al. | 348/46 |
| 2003/0234866 A1* | 12/2003 | Cutler | 348/207.1 |
| 2004/0016870 A1* | 1/2004 | Pawlicki et al. | 250/208.1 |
| 2004/0032649 A1* | 2/2004 | Kondo et al. | 359/364 |
| 2004/0071367 A1* | 4/2004 | Irani et al. | 382/284 |
| 2004/0179116 A1 | 9/2004 | Stavely et al. | |
| 2004/0234124 A1* | 11/2004 | Nakai et al. | 382/154 |
| 2005/0265619 A1* | 12/2005 | Ozaki | 382/254 |
| 2006/0023073 A1* | 2/2006 | Li et al. | 348/211.99 |
| 2006/0056056 A1* | 3/2006 | Ahiska et al. | 359/690 |
| 2006/0176369 A1* | 8/2006 | Meritt | 348/143 |
| 2006/0187305 A1* | 8/2006 | Trivedi et al. | 348/169 |
| 2006/0268131 A1* | 11/2006 | Cutler | 348/239 |
| 2007/0103491 A1* | 5/2007 | Moriya et al. | 345/694 |
| 2007/0229923 A1* | 10/2007 | Itagaki et al. | 358/504 |
| 2007/0237420 A1* | 10/2007 | Steedly et al. | 382/284 |
| 2007/0296809 A1* | 12/2007 | Newbery | 348/42 |
| 2008/0205773 A1* | 8/2008 | Ma et al. | 382/225 |
| 2008/0240558 A1* | 10/2008 | Li et al. | 382/167 |
| 2008/0240612 A1* | 10/2008 | Liang et al. | 382/284 |
| 2008/0316328 A1* | 12/2008 | Steinberg et al. | 348/222.1 |
| 2009/0086324 A1* | 4/2009 | Saita et al. | 359/589 |
| 2009/0201309 A1* | 8/2009 | Demos | 345/589 |
| 2009/0263022 A1* | 10/2009 | Petrescu et al. | 382/195 |
| 2010/0045875 A1* | 2/2010 | Pugel | 348/731 |
| 2010/0182403 A1* | 7/2010 | Chun et al. | 348/43 |
| 2010/0182432 A1* | 7/2010 | Augst | 348/148 |
| 2010/0283842 A1* | 11/2010 | Guissin et al. | 348/68 |
| 2011/0035054 A1* | 2/2011 | Gal et al. | 700/258 |

FOREIGN PATENT DOCUMENTS

| | | |
|---|---|---|
| EP | 1 478 176 | 11/2004 |
| EP | 1 600 890 | 11/2005 |
| GB | 2 362 284 | 11/2001 |
| WO | 01 24515 | 4/2001 |
| WO | 03 027766 | 4/2003 |
| WO | 2007 060497 | 5/2007 |

* cited by examiner

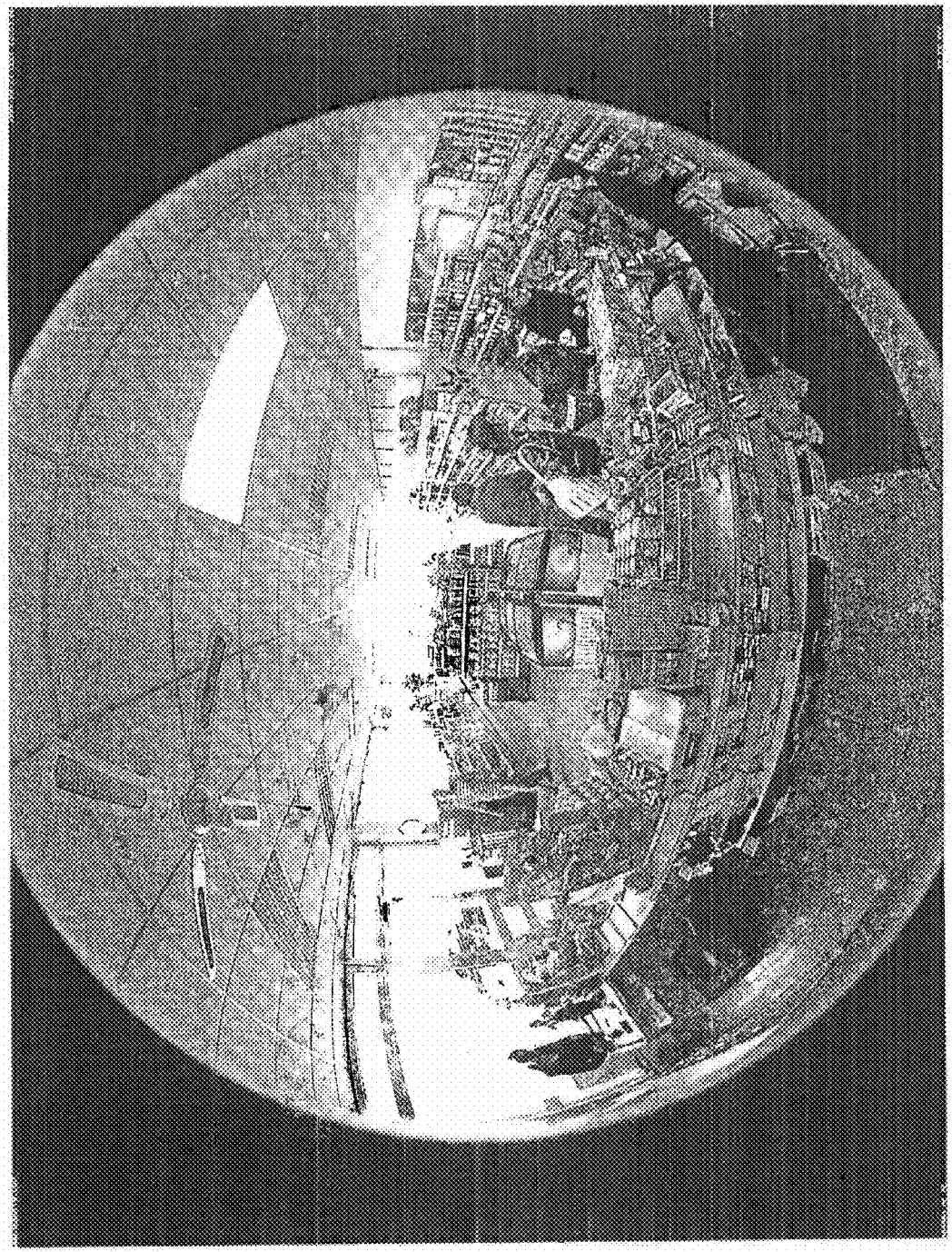

METHOD FOR GENERATING VIDEO DATA STREAM

The present invention is concerned with what is claimed in the preamble, and thus relates to the use of cameras.

Video cameras are known. They comprise a sensor that repeatedly records images in order to be able to provide image data for a display or for storage. High-resolution cameras, for example having fish-eye lenses, are also known in which the lens-governed optical distortion can be compensated for by data processing for display purposes.

Video streams make high requirements of transmission lines, data-processing processors and display devices. On account of bandwidths or computing capacities, it is often not possible to enable images to be represented with high resolution and/or jointly. As cameras become used more widely, however, users increasingly want to be able to obtain video streams from a specific camera even when a powerful computer system is not currently available. By way of example, mention shall be made here of the desire of many subscribers to be able to use video telephones with low outlay or to ensure monitoring via a mobile telephone using web-based cameras; this allows parents, for example, by means of cameras fitted accordingly at home, to see their children even when they are absent, and to check whether their children are fast asleep at night. Such checking may be expedient within the home or near home, in a manner comparable with the "babyphones", which hitherto have only had acoustic action. The fact that other surveillance tasks may likewise be expedient in addition, for instance for the surveillance for industrial installations, outdoor installations, etc., shall be mentioned only for the sake of completeness.

What is problematic, however, is that the display of an individual video channel is often insufficient, for instance because a relatively large region or a number of children is/are to be monitored. Although it would be possible, in principle, to progressively interrogate a plurality of cameras from which individual images are obtained cyclically, this is inadequate precisely in the case of danger and does not meet the requirements of many users. Moreover, the network load is high.

It is desirable, therefore, to enable the reproduction of video streams which can show many different individual images even on less powerful devices.

The problem addressed by the present invention consists in providing novel subject matter for industrial application.

The solution to this problem is claimed in independent form. Preferred embodiments are found in the dependent claims.

Consequently, the present invention proposes, in a first basic concept, a method for generating video stream data relating to different fields of view from a camera having a sensor which records high-resolution images in a distorted manner, it being provided that a respective image correction is performed for separate fields of view, and a total video stream is output from the differently corrected image data.

Consequently, one essential aspect of the invention is based on the insight that it is possible not only to determine separate excerpts from a large quantity of image data and, if appropriate, to perform for said excerpts image corrections which enable adaptation to a simple display device, rather that it thus also becomes possible to provide a single total video stream carrying different fields of view combined in itself in order thus to enable display on a display device without a high computational load. In this case, it is possible without problems to provide the total video stream as a conventional video stream such as, for example, with MPEG coding, etc., to enable compression, etc.

Moreover, the total video stream can be generated from original images stored at or in the camera. The storage only of the original images at the camera requires less storage space in comparison with a case in which rectified excerpts also additionally have to be stored. Image data can be stored at the camera by being saved to a nearby hard disk via a USB interface, for example.

It suffices, in particular, to safeguard an area using just one camera according to the invention; thus, by way of example, a plurality of checkouts in a supermarket can be monitored by means of a single camera.

It is preferred that the camera is a wide-angle camera, in particular a fish-eye camera, which covers a half-space or almost a half-space, that is to say has a viewing angle of 170° or higher. In this case, particularly great image deformation, that is to say distortion of the high-resolution images, is to be expected particularly at the image edge and, moreover, the separate image connection for different fields of view is particularly expedient and necessary. Thus, an image rectification which is necessary for a field of view lying at the outer left image edge will have to appear significantly different than, for instance, an image rectification for a field of view lying near the central viewing axis. It becomes possible, by means of separate rectifications for example using algorithms for which only different parameters have to be predefined, to obtain a geometry that gives a natural impression for different image regions, which makes continuous observation more pleasant.

The high-resolution images are typically recorded as individual images by the sensor and combined to form a video stream only in the camera. The images can originate from a megapixel sensor, having a resolution of two to twelve megapixels, for example. Since, in this case, it is not necessary, at any rate not absolutely necessary, to convert the entire image information from all pixels of the high-resolution image to form a video stream, a typically sufficient computing power for performing the method without particularly measures is available even with conventional cameras.

In one particularly preferred variant, the correction of the images and the combination of the corrected images to form a total video stream will therefore be effected within the camera. This is also advantageous because it can thus be ensured that the individual partial images of the total video stream are based on the best possible sensor information, without losses of information being brought about by compression for data transmission prior to the geometrical rectification. Detail reproduction with good resolution is thus ensured despite the use of a total video stream with a low data rate.

The preferred camera of the invention accordingly comprises a sensor, a processing unit for correction and combination and a communication unit. No separate additional devices are required, although such additional devices could indeed plausibly be provided, for instance if older cameras having low computing power with very high-quality optics should be used or an already installed camera that is still weak computationally is not intended to be immediately replaced on account of particularly costly vandalism protection against destruction.

The method of the present invention can be performed such that virtual cameras are defined within the total field of view. Said virtual cameras can, in particular, be panned, tilted or zoomed like real cameras, such that an intuitive control of the fields of view is possible, without wearing parts having to be moved. Moreover, it is not evident to observed persons whether they are currently the focus of attention. This increases the deterrence. The corrections can then be performed for the virtual, separate fields of view obtained with the virtual cameras. In this way, only those image pixels which lie in the field of view of a virtual camera have to be subjected to treatment. Typically, the fields of view of differential virtual cameras will be situated separately, that is to say will not adjoin one another. It should be mentioned, however, that overlaps can also occur in exceptional cases.

The virtual cameras can preferably be individually panned, tilted and/or zoomed. This can preferably be done by the manipulation of a pointing device on the partial image which corresponds to the virtual camera in the total video stream. A typical pointing device manipulation is, for example, a mouse actuation or a joystick actuation.

In one particularly preferred variant, on the one hand a panoramic image and on the other hand at least one image excerpt can be provided. The panoramic image, particularly when a fish-eye camera is used, can be cropped at the upper and lower regions and need not extend as far as the extreme outer left and right image boundaries. This ensures a sufficiently high resolution in all regions. It should be mentioned, however, that this is not of essential importance in the case of display devices having a low resolution per se, such as mobile telephones.

In typical applications, non-overlapping fields of view will be defined.

The image correction can be carried out, firstly, in order to bring about a geometrical rectification such as is particularly necessary in the case of fish-eye lenses. At the same time, however, it is also possible to correct brightnesses, color hues, etc. For this purpose, it can be taken into consideration that specific regions of an image either have a different brightness from the outset on account of the conditions in the observed fields of view and/or a specific darkening occurs in the edge regions. The same applies to color corrections which may be necessary firstly as a result of differently tinted illuminations of different field of view regions and secondly as a result of lens aberrations. In this case, the image correction is typically performed in such a way that when the individual fields of view are combined to form a total video stream, this results in a video stream which at least approximately has the same brightness for all the fields of view, and which will preferably also have the same tint. This makes it easier to view the images on a display device—such as a mobile telephone—that is inexpensive and thus typically has only a low dynamic range and color gamut.

The total video stream is typically output to a display device exhibiting single-channel reception. In this case, single-channel does not relate to whether signals are actually received only on a single channel—it is pointed out that in modern mobile telephones, for instance, a plurality of frequencies are used simultaneously for data transmission—rather reference is made to the fact that the display device will typically be designed only for receiving a single video stream. Such a video stream will typically not constitute particularly high loading for the display device. Since the rectification will not be effected at the display device either, this results overall in low loading.

The video stream can be transmitted in a standard video stream format such as, for example, 16:9 or 4:3 or the like. The fact that here different compression methods such as MPEG, such as are possible and known per se in the prior art, can be employed should not only be mentioned but, with regard to the fact that the application will be particularly efficient, even emphasized.

It will typically be possible and preferred if a plurality of display devices can be addressed from one camera, in particular by the provision of video streams which are in each case conditioned in accordance with the present invention; the fact that instead individual or all display devices can obtain the full data video stream should be mentioned. Typically, a camera will be able to rectify m field of view and be able to output video streams to n consumers, where it will be the case that m≥2 and n≥1.

If different total video streams are provided for different display devices, it can happen that at least one field of view is the same in the different total video streams or one of the fields of view in one of the video streams is completely encompassed in a field of view of the other total video stream. In such a case, it is respectively preferred if, for this field of view, the image correction has to be performed only once. In this case, the image correction which is performed only once can be, if appropriate, a geometrical image correction, particularly when the fields of view largely overlap; other necessary corrections such as hue or brightness adaptation can, by contrast, refer to other image constituents of the total video stream respectively to be provided for a display device. Even in such a case, as a result of the common reference to a single (geometrical) image correction, this then results in a reduction of computing load at the camera.

A particularly preferred display is obtained if at least one panoramic image is combined with at least two detail images to form a total video stream and/or four individual images are combined to form a total video stream. It is advantageous for all the partial images of the total video stream to have the same timing, that is to say to be synchronous. This is particularly advantageous if sound reproduction is intended to be effected simultaneously.

The invention allows a plurality of cameras, which have had to be used heretofore for specific tasks such as gasoline pump monitoring at a relatively large gas station or checkout monitoring of a plurality of checkouts in a supermarket, to be replaced by a single high-resolution camera. This reduces the installation outlay and the maintenance costs, the network capacity utilization remaining low according to the invention. It is advantageous in particular in this case if the camera can identify objects and enables automatic tracking of said objects in the partial images of the total video stream, for which purpose and in which case in particular the settings of virtual cameras can be changed, such as rectification, image brightness, tilt, pan direction and/or zoom factor.

The invention is explained below merely by way of example with reference to the figures. In the figures:

FIG. 1 illustrates an image representing a scene recorded with high resolution by a fish-eye camera, FIG. 2a illustrates an image region rectified for representing a panorama, said image region representing a first excerpt from FIG. 1, FIG. 2b illustrates the image region from FIG. 2a with different rectification, FIG. 3 illustrates a different excerpt from the scene recorded by the fish-eye camera, FIG. 4 illustrates a further excerpt from the scene, FIG. 5 illustrates another excerpt from the scene, FIG. 6 illustrates a further corresponding excerpt from the scene, and FIG. 7 illustrates an image of a composite video stream comprising the panoramic overview from FIG. 2, the excerpt from FIG. 5 and the excerpt from FIG. 6.

The present invention relates to a method for reproducing video stream data relating to different fields of view from a camera having a sensor which records high-resolution images in a distorted manner. One typical image of this type is illustrated in FIG. 1. It should moreover be pointed out that where the figure designation such as "FIG. 1" or "FIG. 5" has been copied into the image, this is clearly not part of the originally recorded image, but was necessary for explanation reasons.

Figure 2A:
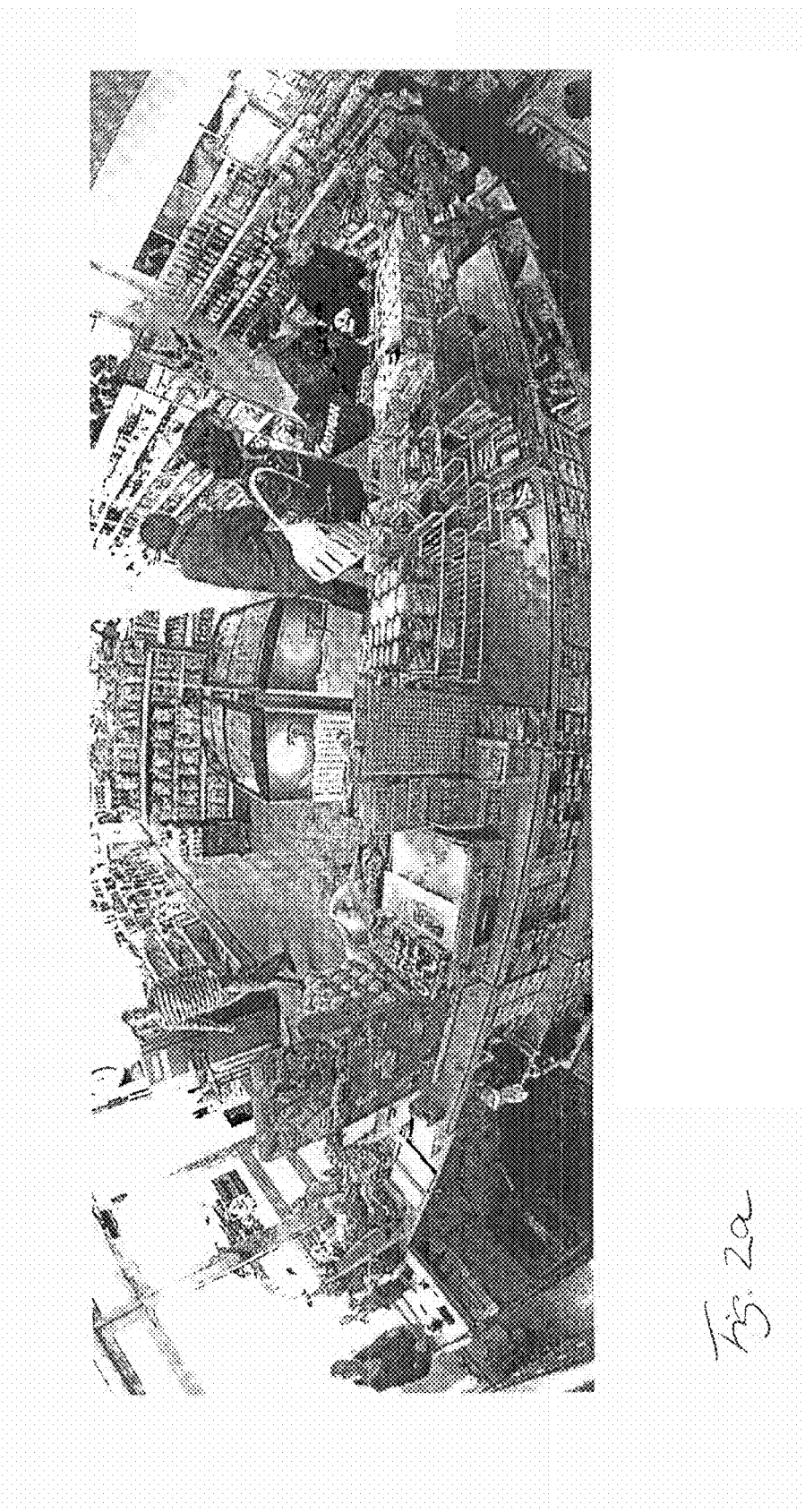
Figure 2B:
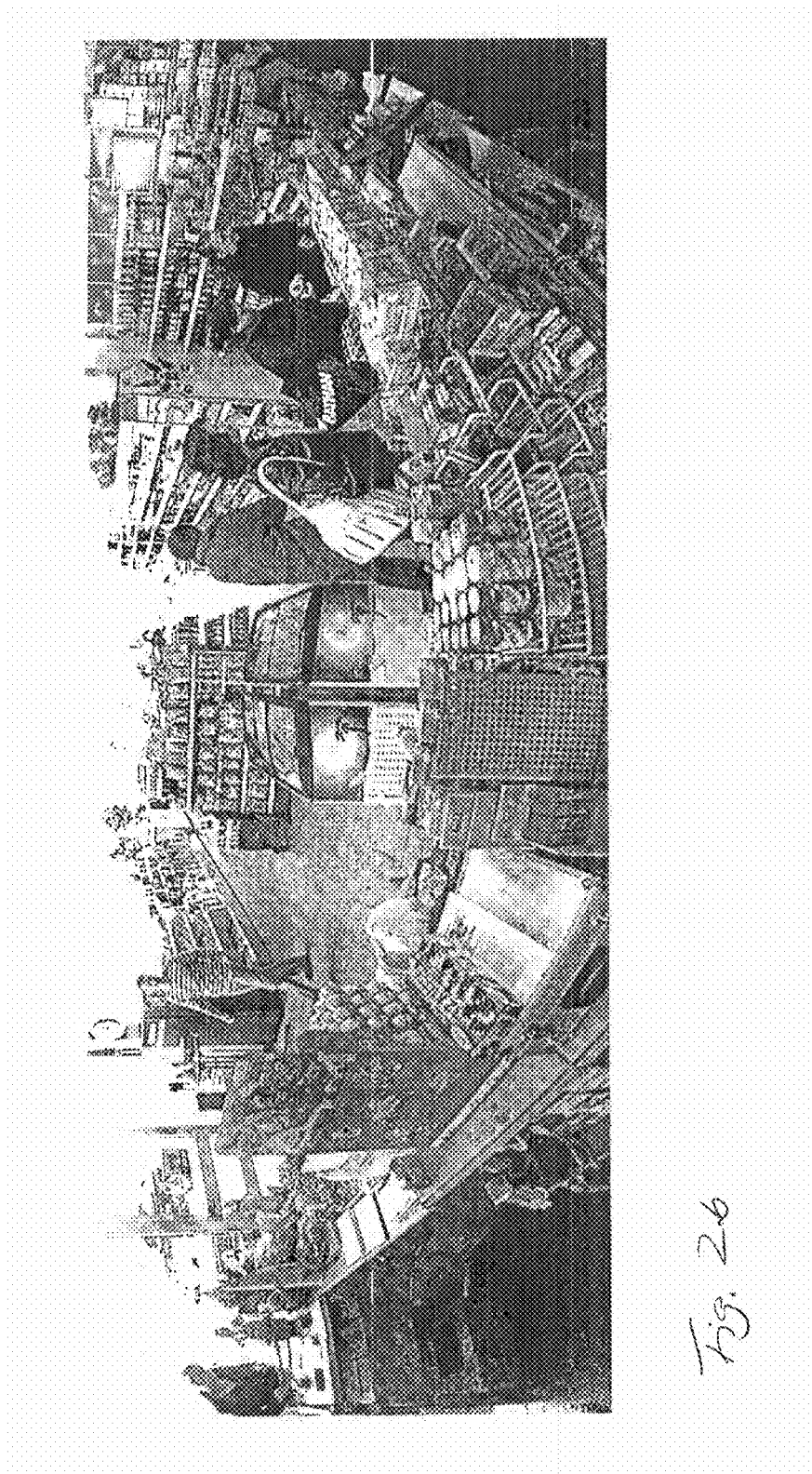
Figure 4:
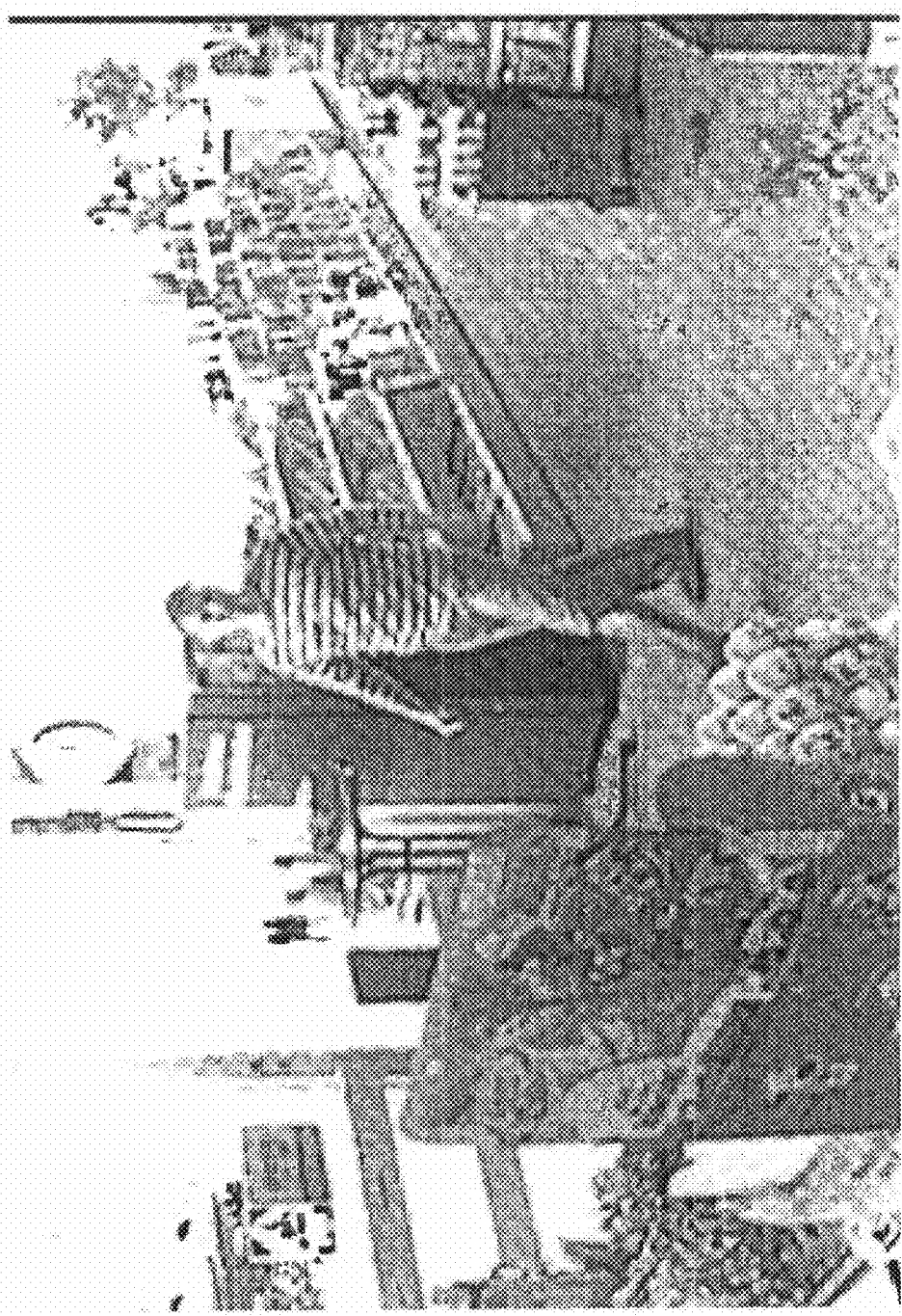

It is assumed in the present case that the general technology of megapixel cameras is known to a person of average skill in the art, and likewise the algorithms for carrying out image rectification in order, for instance, to make the counter in FIG. 1 appear less curved, cf. FIG. 2 partially rectified in this respect. Therefore, they will not be discussed per se below. In the present case, the camera is preferably designed, however, such that a given image excerpt, for example that from FIG. 2a, can be rectified in different ways. This is deemed to be novel and advantageous. This is illustrated in FIG. 2b, which in the case of continuous monitoring of an area by means of a panoramic image conveys a more natural impression of the area. However, the possibility of using a plurality of rectifications is not mandatory, but rather only greatly preferred.

It is furthermore assumed that the technique for the definition of excerpts and the rectification of individual excerpts such as the excerpts from FIG. 3, FIG. 4, FIG. 5, FIG. 6 are also known to the person of average skill in the art insofar as a specific field of view has to be defined within an image. Said field of view will then be rectified in a dedicated way in a manner known per se, in which case different rectifications can once again preferably be available.

Figure 5:
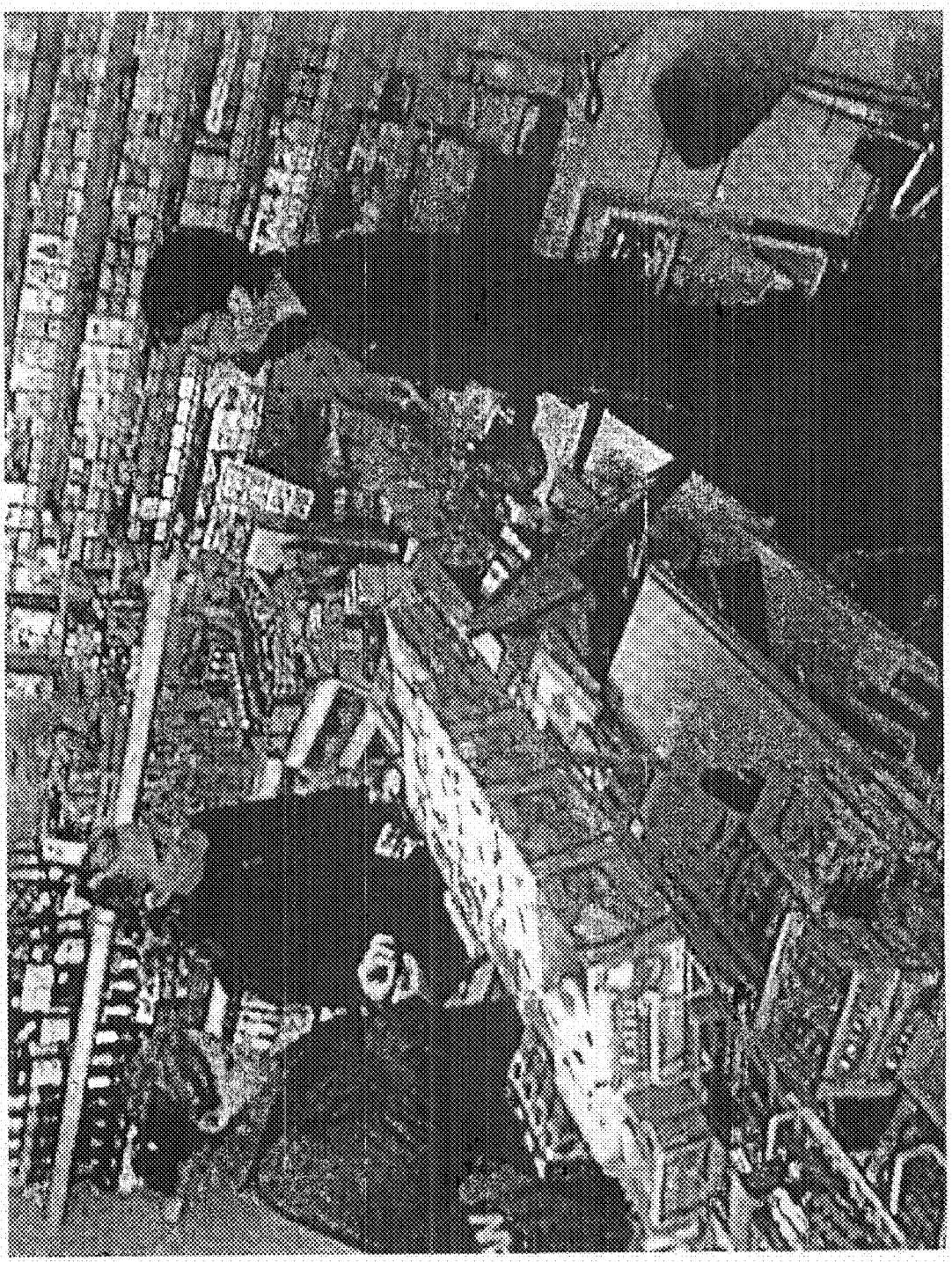
Figure 6:
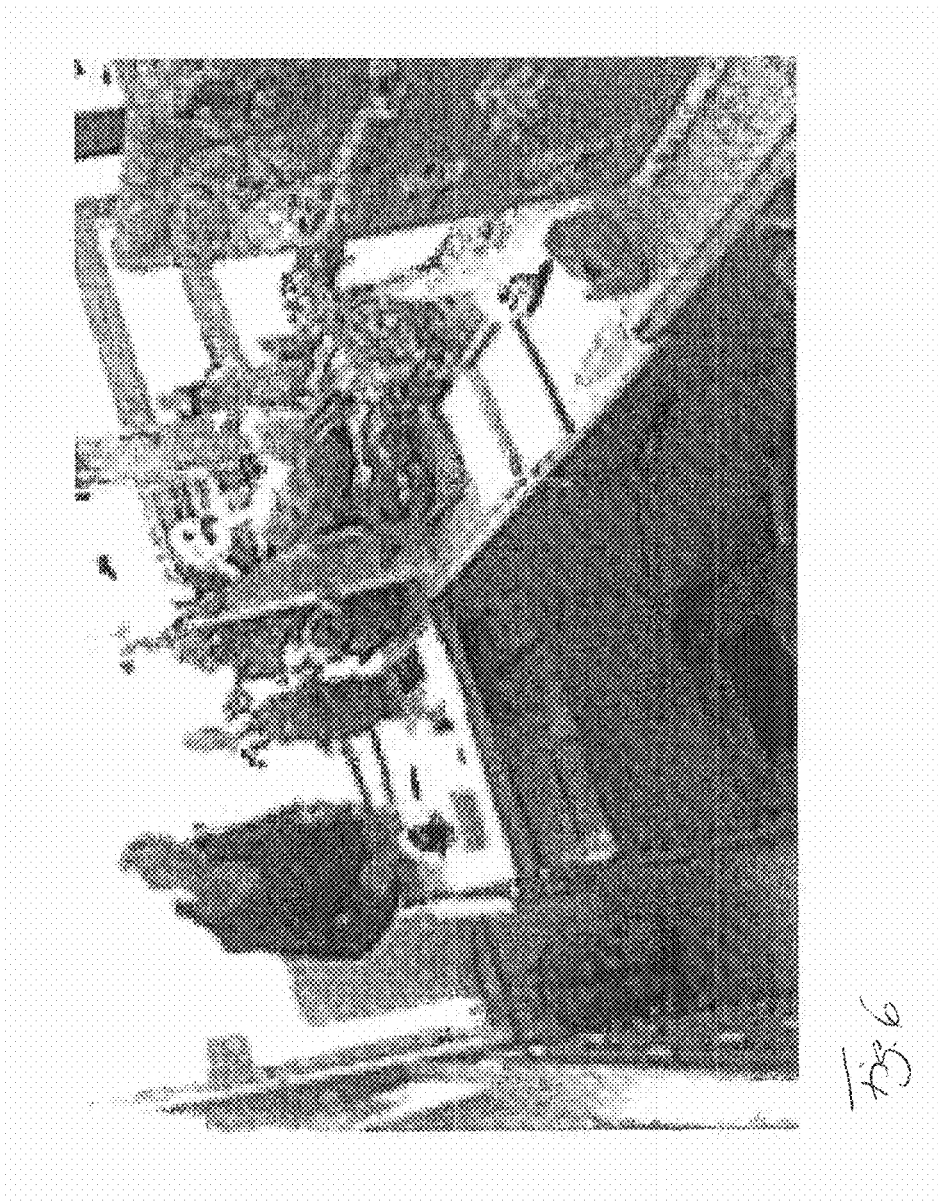

In this case, it should be pointed out by way of example that the shopper at the outer right image edge is represented with greater distortion in FIG. 3 than in FIG. 5, which shows the same excerpt with different rectification.

Rectification can plausibly be performed in a different way, for instance in such a way that edge regions are rectified to a lesser extent or instead to a better extent. It is preferred, therefore, to offer different rectifications and to allow the user to choose a rectification which rectifies particularly well regions that are important to said user and/or conveys to said user an impression that is particularly pleasant to said user because it seems natural; it is thereby possible, for example, for specific lines which would otherwise be curved incorrectly in the image to be represented straight.

Figure 7:
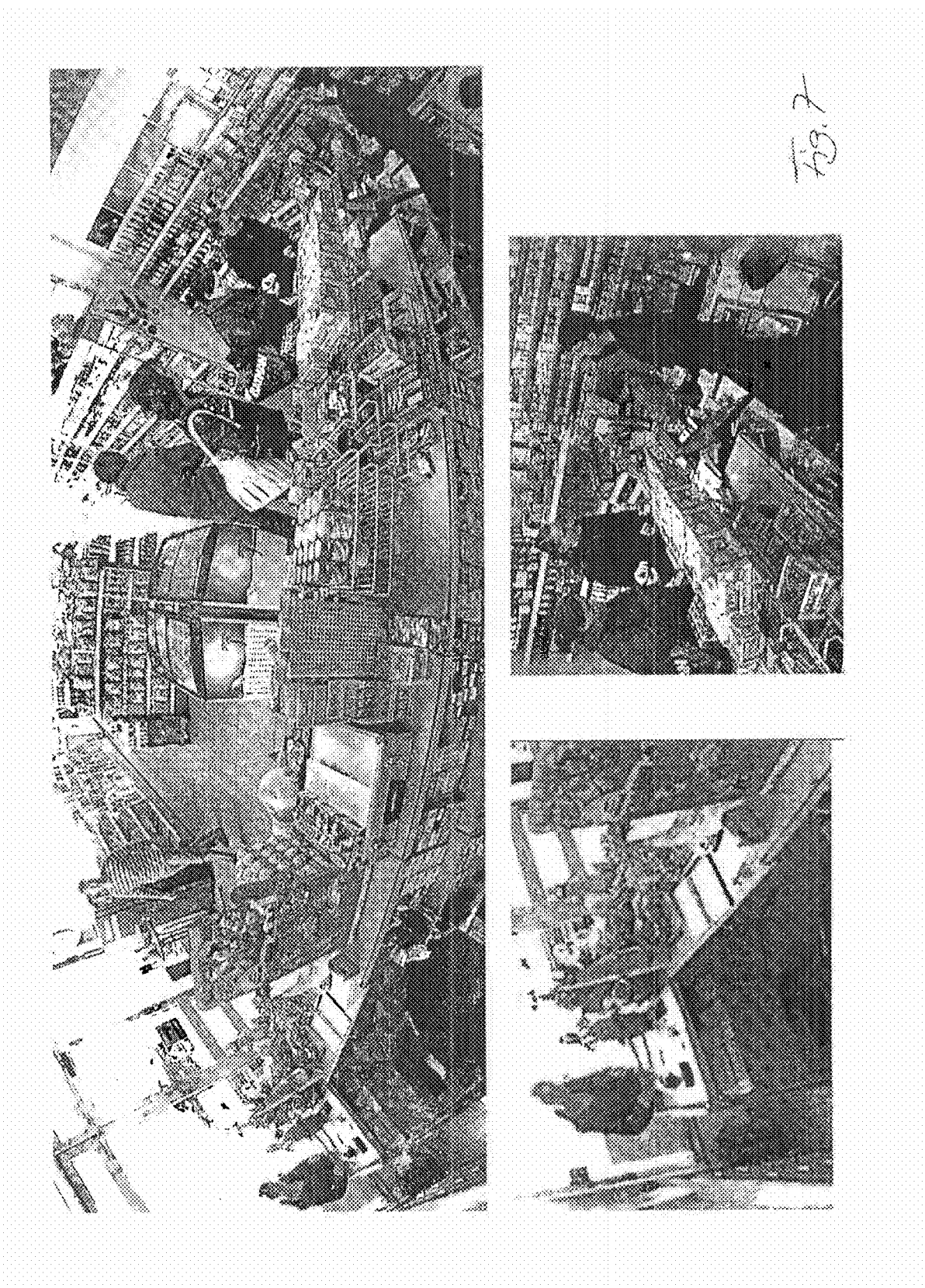

In order, then, proceeding from an image in accordance with FIG. 1, to arrive at a video stream according to the invention corresponding to FIG. 7 with one panoramic section and two detail sections which are combined to form a joint video stream in a standard format, the respective individual excerpts being renewed simultaneously with one another, such that a high degree of synchronism in observation can be obtained, the following procedure is adopted:

Firstly, a first excerpt, for example the panorama from FIG. 2, is defined. This can take place at the display device in a video stream transmitted as a total video stream in accordance with the images from FIG. 1 in a largely unrectified, but compressed image. The display means therefore do not have to rectify the image at any point in time.

The excerpts can be defined in accordance with a pan-tilt-zoom movement in the case of a conventional pan-tilt-zoom camera, with the stipulation that an image aspect ratio can additionally be predefined as well.

After the definition of a first image region that a user wants to see on an inexpensive display device, it is possible in addition to define a further excerpt, for example as illustrated in FIG. 7, and then a third excerpt as illustrated in FIG. 5, for example. It is possible to provide an automatic arrangement and predefinition of excerpts. In such a case, the user does not have to be concerned with the image aspect ratio, but rather only has to correspondingly place respective excerpts into the image from FIG. 1.

After the individual excerpts have been defined, excerpts are respectively taken from the non-rectified image data in accordance with FIG. 1 and are rectified per se and then a brightness adaptation of the here three image excerpts to one another is performed in order to achieve a uniform illumination of all the display regions of a display device that receives and represents the video stream. The fact that, if appropriate, with provision of in each case a plurality of different rectification possibilities for the different image regions, the rectifications of the individual images are adapted to one another in order to ensure the best possible, relaxed viewing, should be mentioned as preferred. After geometrical image rectification, contrast adaptation, color balancing, etc., the individual images are then combined with one another to form an image in a standard format such as 16:9 in accordance with FIG. 7. The excerpts corresponding to progressively successive images in accordance with FIG. 7 then constitute a video stream, in each "window" a video film running which, moreover, is highly synchronous with the other images, which is advantageous for sound reproduction. The video stream can be compressed and output via a single channel to a display device, where it can be represented with low computational complexity. The network load as a result of the transmission of the image is low in this case.

Figure 8:
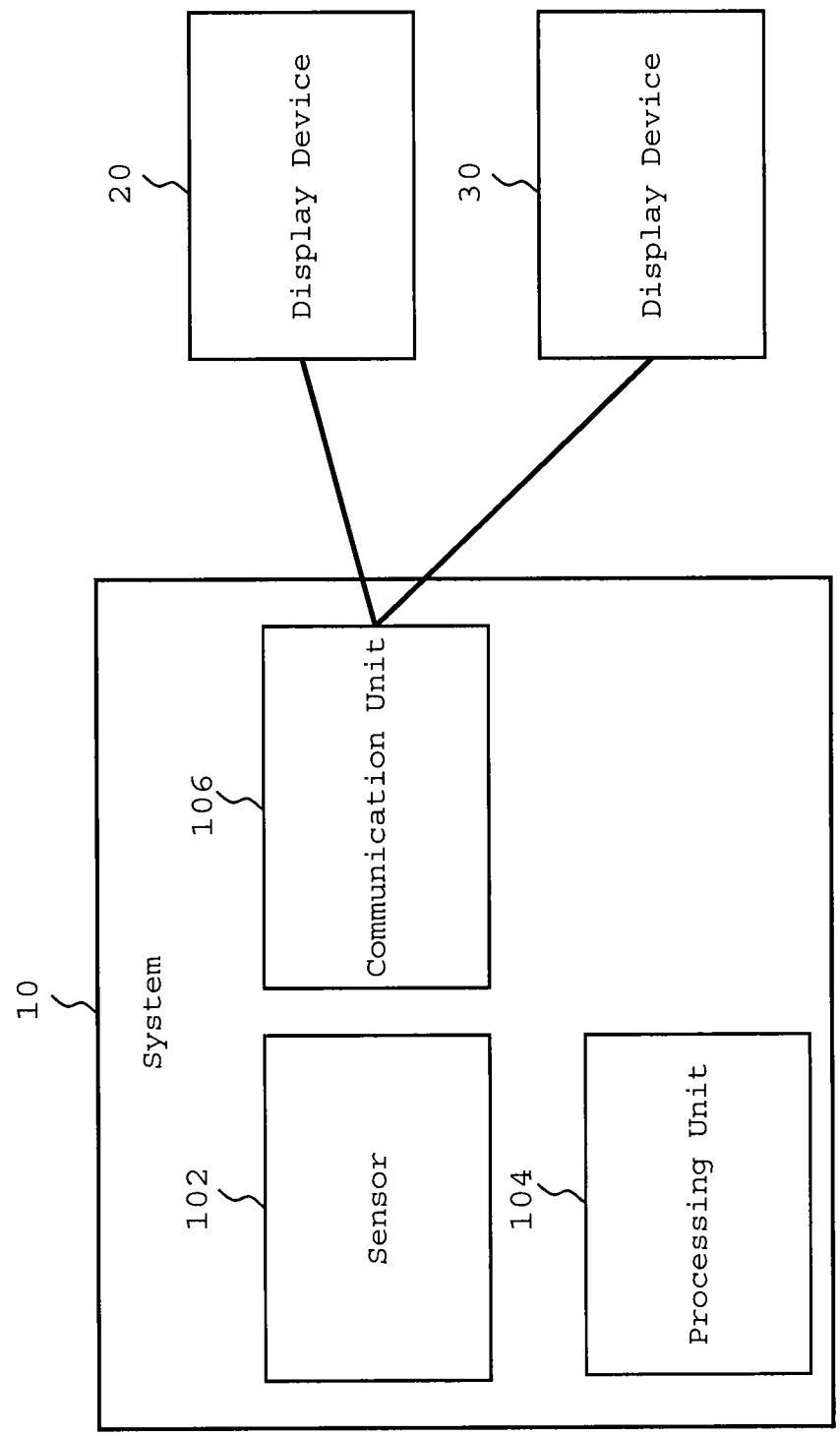
FIG. 8 illustrates an exemplary block diagram of a system according to one or more embodiments.

FIG. 8 is an exemplary block diagram of a system according to one or more embodiments. The system 10 (e.g., a camera) can comprise a sensor 102, a processing unit 104 for correction and combination and a communication unit 106. No separate additional devices are required, although such additional devices could indeed plausibly be provided.

Figure 9:
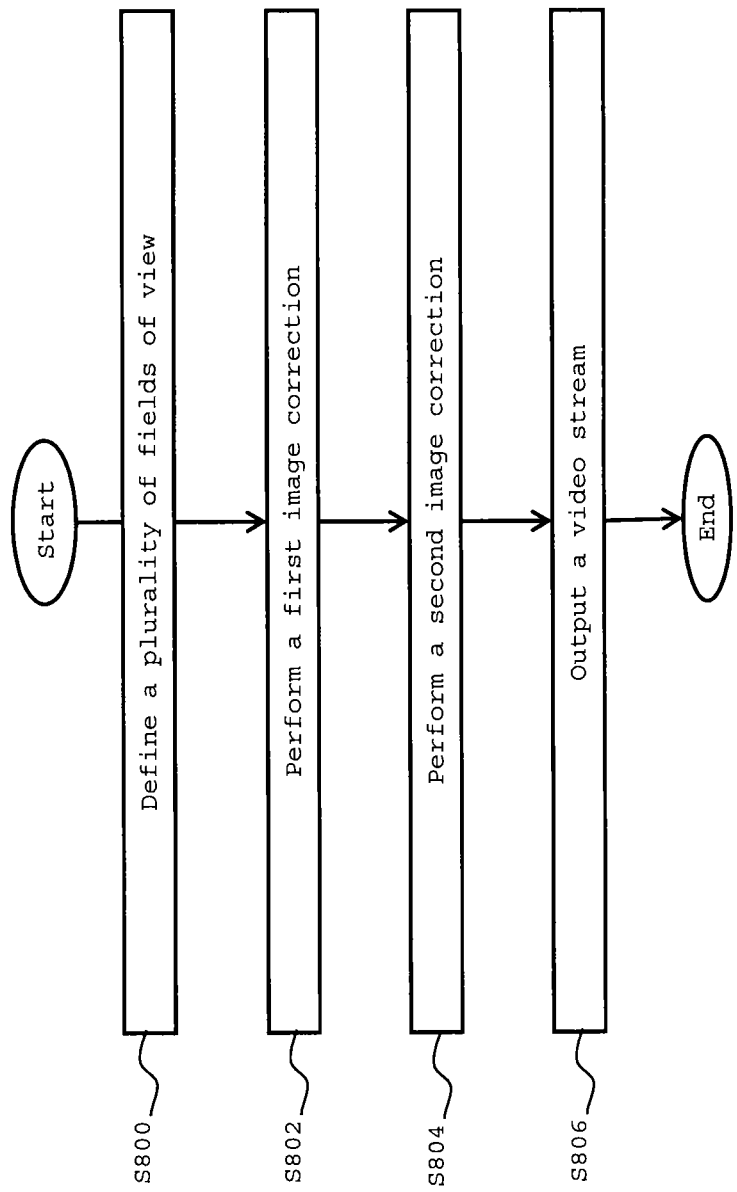
FIG. 9 illustrates an exemplary flow chart of a method for generating video stream data according to one or more embodiments.

FIG. 9 is an exemplary flow chart of a method for generating video stream data according to one or more embodiments. Step 800 defines a step of defining a plurality of fields of view. Step 800 can include defining a plurality of fields of view as one of non-overlapping fields of view, which do not overlap between a first set of fields of view and a second set of fields of view, and overlapping fields of view, which overlap between the first set of fields of view and the second set of fields of view. Step 802 defines a step of performing a first image correction. The first image correction can include correcting geometric distortion of each of the first set of fields of view and the second set of fields of view, the first image correction being performed only once as to the overlapping fields of view. Step 804 defines a step of performing a second image correction. The second image correction can include correcting image brightness and color hue of each of the first set of fields of view by referring to other fields of view of the first set of fields of view so that each of the first set of fields of view has approximately the same brightness and color hue, and by correcting image brightness and color hue of each of the second set of fields of view by referring to other fields of view of the second set of fields of view so that each of the second set of fields of view has approximately the same brightness and color hue. Step 806 defines a step of outputting a video stream. Outputting a video stream can comprise outputting a first video stream based on combining image data corresponding to the first set of fields of view after the first image correction and the second image correction. The outputting a video stream can also comprise outputting a second video stream.

If different total video streams are provided for different display devices 20 and 30, for example, it can happen that at least one field of view is the same in the different total video streams or one of the fields of view in one of the video streams is completely encompassed in a field of view of the other total video stream. In such a case, for this field of view, the image correction has to be performed only once. In this case, the image correction which is performed only once can be, if appropriate, a geometrical image correction, particularly when the fields of view largely overlap; other necessary corrections such as hue or brightness adaptation can, by contrast, refer to other image constituents of the total video stream respectively to be provided for a display device. Even in such a case, as a result of the common reference to a single (geometrical) image correction, this then results in a reduction of computing load at the camera.

The invention claimed is:

1. A method for generating video stream data of a first video stream and a second video stream relating to a total field of view comprising a plurality of fields of view from a wide angle camera having a sensor which records a distorted image of the total field of view, the distorted image comprising a plurality of distorted images corresponding to the plurality of fields of view, the first video stream comprising first image data corresponding to a first set of fields of view of the plurality of fields of view, the second video stream comprising second image data corresponding to a second set of fields of view of the plurality of fields of view, the method comprising:

performing an image correction process including:
performing a first image correction, using a processor, by correcting geometric distortion of each field of view of the first set of fields of view and each field of view of the second set of fields of view, the first image correction being performed only once as to a field of view of the plurality of fields of view defined as an overlapping field of view, which overlaps between the first set of fields of view and the second set of fields of view; and
performing a second image correction, using the processor, by correcting image brightness and color hue of each field of view of the first set of fields of view by referring to other fields of view of the first set of fields of view, including the overlapping field of view corrected in the first image correction, so that all fields of view of the first set of fields of view have approximately the same brightness and color hue, and by correcting image brightness and color hue of each field of view of the second set of fields of view by referring to other fields of view of the second set of fields of view, including the overlapping field of view corrected in the first image correction, so that all fields of view of the second set of fields of view have approximately the same brightness and color hue; and
outputting the first video stream based on combining image data corresponding to the first set of fields of view after the first image correction and the second image correction.

2. The method as claimed in claim 1, wherein the wide angle camera is a fish-eye camera having a total field of view larger than 170°.

3. The method as claimed in either of claims 1 and 2, wherein the distorted images are individually recorded by the sensor.

4. The method as claimed in either of claims 1 and 2, wherein the first image correction and the second image correction are performed within the wide angle camera.

5. The method as claimed in either of claims 1 and 2, further comprising:
defining a first virtual camera corresponding to each field view of the first set of fields of view;
defining a second virtual camera corresponding to each field of view of the second set of fields of view; and
forming the first video stream by combining the image data corresponding to the first set of fields of view after the first image correction and the second image correction obtained from the first virtual camera.

6. The method as claimed in claim 5, wherein each of the first and second virtual cameras are independently controllable to change at least one of pan, tilt, and zoom settings.

7. The method as claimed in claim 5, wherein a type of the first image correction, which is performed in the wide angle camera, is performed on a per each of the first and second virtual camera basis, and the type of the first image correction is determined based on user input.

8. The method as claimed in claim 5, wherein camera objects are identified and tracked via the first and second virtual cameras.

9. The method as claimed in either of claims 1 and 2, wherein at least one panoramic image and one image excerpt are provided with the first set of fields of view.

10. The method as claimed in either of claims 1 and 2, further comprising correcting image resolution of the first set of fields of view and the second set of fields of view.

11. The method as claimed in either of claims 1 and 2, wherein the first video stream is output to a single-channel display device.

12. The method as claimed in claim 11, wherein the first video stream is output in one of a standard image format and a standard video stream format.

13. The method as claimed in either of claims 1 and 2, wherein a plurality of display devices are addressed by the wide angle camera.

14. The method as claimed in claim 13, wherein display image data for the plurality of display devices are combined to form a plurality of total video streams, which includes the first video stream.

15. The method as claimed in claim 13, wherein the plurality of display devices include a mobile telephone.

16. The method as claimed in either of claims 1 and 2, further comprising outputting the second video stream based on combining image data corresponding to the second set of fields of view after the first image correction and the second image correction.

17. The method as claimed in claim 1, further comprising defining each of the plurality of fields of view as one of a non-overlapping field of view, which does not overlap between the first set of fields of view and the second set of fields of view, and the overlapping field of view, which overlaps between the first set of fields of view and the second set of fields of view.

18. The method as claimed in claim 1, wherein the second image correction is performed after the first image correction.

* * * * *